United States Patent Office 3,385,689
Patented May 28, 1968

3,385,689
METHOD OF CONTROLLING UNDESIRABLE PLANT GROWTH
Sidney B. Richter, Chicago, Ill., assignor to Velsicol Chemical Corporation, Chicago, Ill., a corporation of Delaware
No Drawing. Continuation-in-part of application Ser. No. 391,728, Aug. 24, 1964. This application Oct. 11, 1965, Ser. No. 494,918
13 Claims. (Cl. 71—87)

ABSTRACT OF THE DISCLOSURE

A method for the control of undesirable plant life which comprises applying to the locus of the undesirable plant infestation a herbicidal composition comprising an inert carrier and as the essential active ingredient, in a quantity which is herbicidally injurious to said undesirable plant life a compound of the formula

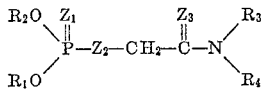

wherein $Z_1$, $Z_2$, and $Z_3$ are independently selected from the group consisting of sulfur and oxygen; $R_1$ is aryl; $R_2$ is selected from the group consisting of alkyl, aralkyl, and aryl; $R_3$ and $R_4$ are independently selected from the group consisting of alkyl, hydroxylalkyl, aryl, alkenyl, aralkyl and hydrogen; provided a maximum of one of $R_3$ and $R_4$ is hydrogen.

---

This application is a continuation-in-part of application Ser. No. 391,728, filed Aug. 24, 1964, now abandoned.

This invention relates to a method of controlling undesirable plant growth. More particularly, this invention relates to the method of controlling undesirable plant growth with a compound of the general formula

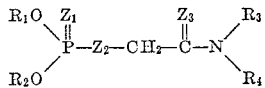

wherein $Z_1$, $Z_2$, and $Z_3$ are independently selected from the group consisting of sulfur and oxygen; $R_1$ is aryl; $R_2$ is selected from the group consisting of alkyl, aralkyl and aryl; $R_3$ and $R_4$ are independently selected from the group consisting of alkyl, hydroxyalkyl, unsubstituted aryl, substituted aryl, alkenyl, aralkyl, and hydrogen; provided a maximum of one of $R_3$ and $R_4$ is hydrogen. It is preferred that $R_1$ be selected from the group consisting of unsubstituted aryl containing 6 to 10 carbon atoms and substituted aryl wherein the substituents are selected from the group consisting of alkyl containing 1 to 10 carbon atoms, halogen and mixtures thereof; $R_2$ be independently selected from the group consisting of alkyl containing 1 to 10 carbon atoms, aralkyl containing 7 to 20 carbon atoms, and aryl containing 6 to 20 carbon atoms; $R_3$ and $R_4$ be independently selected from the group consisting of alkyl containing 1 to 10 carbon atoms, hydroxyalkyl containing 1 to 10 carbon atoms, unsubstituted aryl containing 6 to 10 carbon atoms, substituted aryl wherein the substituents are selected from the group consisting of alkyl containing 1 to 10 carbon atoms, halogen and mixtures thereof, alkenyl containing 2 to 10 carbon atoms, aralkyl containing 7 to 20 carbon atoms and hydrogen, provided a maximum of one of $R_3$ and $R_4$ is hydrogen.

Prior to the prevent invention many organic and inorganic substances have been proposed and used in an attempt to control undesirable plants. While several of these substances were partially successful, the problem of controlling the vast number of species of undesirable plant life still exists. Some of the previously proposed substances are toxic to only a few species of plant life, while others are excessively toxic and indiscriminately destroy both desirable and undesirable plant life. Moreover, a great number of the prior substances are ineffective as herbicides. Thus, although many substances have heretofore been proposed as herbicides, the problem of the effective and selective control of undesirable plant life still exists. Therefore, one object of the present invention is the control of undesirable plant life.

Another object of the present invention is to provide a method for the control of undesirable plant life.

These and other objects of the present invention will be readily apparent from the ensuing description.

Unexpectedly it has been found that the method of the present invention is effective in controlling undesirable plant life. Exemplary of compounds which have been found to be useful in this method are:

O-phenyl-O-ethyl S-(N,N-diethylcarbamylmethyl) dithiophosphate,
O-phenyl-O-methyl S-(N-methyl-N-isopropylcarbamylmethyl) dithiophosphate,
O-phenyl-O-n-propyl S-(N-ethyl-N-phenyl-carbamylmethyl) dithiophosphate,
O-2,4-dichlorophenyl-O-ethyl S-(N-n-propyl-N-ethylcarbamylmethyl) dithiophosphate,
O-2-methyl-4-chlorophenyl-O-isopropyl S-(N-methyl-N-phenylcarbamylmethyl) dithiophosphate,
O-4-methylphenyl-O-ethyl S-(N-methyl-N-4-methylbenzylcarbamylmethyl) dithiophosphate,
O-4-methylthiophenyl-O-methyl S-(N-ethyl-N-4-chlorophenylcarbamylethyl) dithiophosphate,
O-phenyl-O-ethyl S-(N,N-diallylcarbamylmethyl) dithiophosphate,
O-3-cyanophenyl-O-ethyl S-(N-allyl-N-octylcarbamylmethyl) dithiophosphate,
O-phenyl-O-methyl S-(N,N-dimethylcarbamylmethyl) dithiophosphate;
O-phenyl-O-ethyl S-(N,N-dimethylcarbamylmethyl) dithiophosphate;
O-2,4-dichlorophenyl-O-methyl S-(N,N-dimethylcarbamylmethyl) dithiophosphate;
O-2,4-dimethylphenyl-O-methyl S-(N,N-dimethylcarbamylmethyl) dithiophosphate;
O-2,4,5-trichlorophenyl-O-methyl S-(N,N-dimethylcarbamylmethyl) dithiophosphate;
O,O-diphenyl S-(N,N-dimethylcarbamylmethyl) dithiophosphate;
O-phenyl-O-methyl S-(N-phenylcarbamylmethyl) dithiophosphate;
O-phenyl-O-methyl S-(N-phenyl-N-methylcarbamylmethyl) dithiophosphate;
O-phenyl-O-ethyl S-(N-3-methylphenylcarbamylmethyl) dithiophosphate;
O-2,4-dichlorophenyl-O-methyl S-(N-2,4-dichlorophenylcarbamylmethyl) dithiophosphate;
O-phenyl-O-ethyl S-(N-ethyl-N-isopropylcarbamylmethyl) dithiophosphate;
O-phenyl-O-ethyl S-(N-methyl-N-isopropylcarbamylmethyl) dithiophosphate;
O-phenyl-O-ethyl S-(N-ethyl-N-phenylcarbamylmethyl) dithiophosphate; and the like.

For practical use as herbicides, these compounds are generally incorporated into herbicidal compositions which comprise an inert carrier and a herbicidally toxic amount of the active compound. These essential active ingredients of the herbicidal compositions can be prepared readily by the method described in United States Patent No. 2,494,283.

The manner in which the compounds useful in the method of the present invention can be prepared is illustrated in the following examples:

Example 1.—Preparation of O-phenyl-O-ethyl S-(N,N-dimethylcarbamylmethyl) dithiophosphate N,N-diethyl-α-chloroacetamide (4 g.; 0.0267 mole), O-phenyl-O-ethyl potassium dithiophosphate (10 g.) and benzene (125 ml.) were placed in a 300 ml. three-neck, round bottom flask equipped with a mechanical stirrer and reflux condenser. The mixture was stirred and heated at reflux for about 16 hours. The reaction mixture was allowed to cool and was then filtered. The filtrate was heated under reduced pressure to remove benzene. The residue was dissolved in diethyl ether and the etheral solution was washed twice with water and dried over anhydrous magnesium sulfate. The dried solution was filtered from the magnesium sulfate and was placed under reduced pressure to remove diethyl ether over a period of about 20 hours. The yellow colored oil remaining was filtered through diatomaceous earth filter aid with aspiration to yield O-phenyl-O-ethyl S-(N,N-diethylcarbamylmethyl) dithiophosphate as an oil having the following elemental analysis as calculated for $C_{14}H_{22}NO_3PS_2$:

Theoretical: N, 4.03%; P, 8.93%; S, 18.44%. Found: N, 3.82%; P, 8.28%; S, 20.05%.

Example 2.—Preparation of O-phenyl-O-ethyl S-(N-ethyl-N-isopropylcarbamylmethyl) dithiophosphate N-ethyl-N-isopropyl-α-chloroacetamide (4 g.; 0.0244 mole), O-phenyl-O-ethyl potassium dithiophosphate (8.5 g.) and benzene (125 ml.) were placed in the flask described in Example 1. The reaction mixture was stirred and heated at reflux for about 16 hours. The mixture was cooled, filtered and the filtrate heated under reduced pressure to remove the benzene. The residue was dissolved in diethyl ether and the etheral solution washed twice with water and then dried over anhydrous magnesium sulfate. The etheral solution was filtered from the magnesium sulfate and placed under vacuum for about 20 hours to remove the diethyl ether. The residue was filtered through diatomaceous earth filter aid and the filtrate which was the product O-phenyl-O-ethyl S-(N-ethyl-N-isopropyl-carbamylmethyl) dithiophosphate had the following elemental analysis as calculated for $C_{15}H_{24}NO_3PS_2$:

Theoretical: N, 3.88%; P, 8.59%; S, 17.73%. Found: N, 3.89%; P, 8.00%; S, 19.78%.

Example 3.—Preparation of O-phenyl-O-ethyl S-(N,N-diallylcarbamylmethyl) dithiophosphate N,N,-diallyl-α-chloroacetamide (4 g.; 0.023 mole), O-phenyl-O-ethyl potassium dithiophosphate (7.5 g.) and benzene (125 ml.) were placed in the flask described in the previous examples and heated as detailed therein. The reaction mixture was cooled, filtered and heated under reduced pressure to remove the benzene. The residue was dissolved in ether and the etheral solution washed twice with water, dried over anhydrous magnesium sulfate, filtered from the magnesium sulfate and placed under vacuum for about 20 hours to remove the diethyl ether. The oil which remained was filtered through diatomaceous earth filter aid to yield as the filtrate O-phenyl-O-ethyl S-(N,N-diallylcarbamylmethyl) dithiophosphate having the following elemental analysis as calculated for $C_{16}H_{22}NO_3PS_2$ Theoretical: N, 3.77%; P, 8.36%; S, 17.25%. Found: N, 3.87%; P, 7.63%; S, 19.10%.

Example 4.—Preparation of O-phenyl-O-ethyl S-(N-methyl-N-isopropylcarbamylmethyl) dithiophosphate N-methyl-N-isopropyl-α-chloroacetamide (3.14 g.; 0.021 mole), O-phenyl-O-ethyl potassium dithiophosphate (7.62 g.; 0.028 mole) and benzene (170 ml.) were placed into a 500 ml. three neck, round bottom flask fitted with a mechanical stirrer and reflux condenser. The mixture was stirred and heated at reflux for about 19 hours. The reaction mixture was cooled and filtered and the filtrate washed three times with water (200 ml.), dried over anhydrous magnesium sulfate, filtered from the magnesium sulfate, and heated under reduced pressure to remove the benzene. The residue was placed under vacuum for about 19 hours and then filtered through diatomaceous earth filter aid to yield O-phenyl-O-ethyl S-(N-methyl-N-isopropylcarbamylmethyl) dithiophosphate as a pale yellow oil having a refractive index at 25° C. of 1.5593 and the following elemental analysis as calculated for $C_{14}H_{22}NO_3PS_2$ Theoretical: N, 4.03%; P, 8.93%; S, 18.44%. Found: N, 4.38%; P, 8.21%; S, 20.01%.

Example 5.—Preparation of O-phenyl-O-ethyl S-(N-phenyl-N-ethylcarbamylmethyl dithiophosphate N-phenyl-N-ethyl-α-chloroacetamide (5 g.; 0.025 mole), O-phenyl-O-ethyl potassium dithiophosphate (9.52 g.; 0.035 mole) and benzene (190 ml.) were placed in the flask described in Example 4 and heated as described therein. The reaction mixture was cooled, filtered and the filtrate washed three times with water (200 ml.), dried over anhydrous magnesium sulfate, filtered from the magnesium sulfate and heated under reduced pressure to remove the benzene. The residue was placed under vacuum for about 19 hours and filtered through diatomaceous earth filter aid to yield O-phenyl-O-ethyl S-(N-phenyl-N-ethylcarbamylmethyl) dithiophosphate as a yellow oil having a refractive index at 25° C. of 1.5864 and the following elemental analysis as calculated for $C_{18}H_{22}NO_3PS_2$ Theoretical: N, 3.54%; S, 16.20%. Found: N, 3.59%; S, 16.57%.

The aforementioned herbicidal compositions, which are usually known in the art as formations, enable the active compound to be applied conveniently to the site of the undesirable plant infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates which comprise an active compound according to this invention and as the inert carrier, a solvent and an emulsifier. Such emulsifiable concentrates can be diluted with water to any desired concentration of active compound for application of sprays to the site of the weed infestation. The emulsifiers most commonly used in these concentrates are nonionic or mixtures of nonionic with anionic surface-active agents. A typical herbicidal composition according to this invention is illustrated by the following example, in which the quantities are in parts by weight:

Example 6.—Preparation of a dust

O-phenyl-O-methyl S-(N,N-diethylcarbamylmethyl) dithiophosphate _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. Concentration of the new compounds of this invention and the herbicidal compositions will vary greatly with the type of formulation and the purpose for which it is designed, but generally the herbicidal compositions will comprise from about 0.05 to about 95% by weight of the active compounds of this invention. In a preferred embodiment of this invention, the herbicidal compositions will comprise from about 5 to about 75% by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known including annuals such as pigweed, lambsquarters, yellow foxtail, crab grass, wild mustard, French weed, rye grass, goose grass, chick weed, and smart weed; biennials such as wild carrots, great burdock, mullein, round-leafed mallow, blue thistle, bull thistle, hounds-tongue, moth-mullein, and purple star thistle; or perennials such as white cockel, perennial rye grass, quack grass, Johnson grass, Canada thistle, hedge windweed, Bermuda grass, sheep sorrel, field chickweed, and winter grass. Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The exact amount of compound required will depend upon a variety of factors including the hardness of the particular weed species, weather, method of application, the kind of beneficial plants in the same area, and the like. Thus, while the application of up to only about 1 or 2 ounces of an active compound per acre may be sufficient for good control of a light infestation of weeds growing under adverse conditions, the application of one pound or more of active compound per acre may be required for good control of dense infestation of the hardy weeds growing under favorable conditions.

The herbicidal toxicity of the new compounds of this invention can be illustrated by many of the established testing techniques in the art. For example, emulsifiable concentrate compositions can be diluted by water to concentrations equivalent to four pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to 10 days; and the percent kill, injury, and stand reduction are recorded. The results indicate a high order of herbicidal activity of the compounds of this invention. Comparable pre-planting or post-emergence tests can also be used.

The utility of the method of this invention in controlling undesirable plant life was demonstrated by greenhouse experiments. In one series of experiments the test compounds formulated as aqueous emulsions of acetone solutions containing emulsifiers were sprayed at the designated concentrations on the surface of soil which had been seeded less than 24 hours earlier with seeds of the weed plants. After spraying, the soil containers were placed in the greenhouse and provided with supplementary heat as required and daily or more frequent watering. The injury to each weed species was determined 15 and 20 days after the soil treatment and compared to control plots treated with the same formulations without the essential active compounds. The severity of injury was rated on a scale of from 0 to 10 with 0 denoting no injury and 10 denoting total death of the plant. The results of this series of experiments are presented below:

TABLE I.—BARNYARD GRASS, INJURY RATINGS

| | Concentration, pounds actual chemical per acre | | | | |
|---|---|---|---|---|---|
| | 0.5 | 1.0 | 2.0 | 4.0 | 8.0 |
| Active compound product of— | | | | | |
| Example 1 | 5 | 7 | 7 | 9 | 9 |
| Example 2 | 2 | 7 | 7 | 9 | 9 |
| Example 3 | 7 | 9 | 8 | 9 | 9 |
| Example 4 | 10 | 10 | 9 | 10 | 10 |
| Example 5 | 8 | 9 | 9 | 10 | 10 |

TABLE II.—CRABGRASS, INJURY RATINGS

| | Concentration, pounds actual chemical per acre | | | | |
|---|---|---|---|---|---|
| | 0.5 | 1.0 | 2.0 | 4.0 | 8.0 |
| Active compound product of— | | | | | |
| Example 1 | 9 | 10 | 9 | 10 | 10 |
| Example 2 | 3 | 7 | 8 | 9 | 9 |
| Example 3 | 10 | 10 | 9 | 10 | 10 |
| Example 4 | 10 | 10 | 10 | 10 | 10 |
| Example 5 | 3 | 10 | 9 | 10 | 10 |

I claim:

1. A method for the control of undesirable plant life which comprises applying to the locus of the undesirable plant infestation a herbicidal composition comprising an inert carrier and as the essential active ingredient, in a quantity which is herbicidally injurious to undesirable plant life a compound of the formula

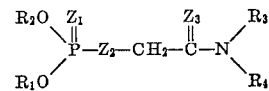

wherein $Z_1$, $Z_2$, and $Z_3$ are independently selected from the group consisting of sulfur and oxygen; $R_1$ is selected from the group consisting of unsubstituted aryl containing 6 to 10 carbon atoms and substituted aryl wherein the substituents are selected from the group consisting of alkyl containing 1 to 10 carbon atoms, halogen and mixtures thereof; $R_2$ is selected from the group consisting of alkyl containing 1 to 10 carbon atoms, aralkyl containing 7 to 20 carbon atoms, and aryl containing 6 to 20 carbon atoms; $R_3$ and $R_4$ are independently selected from the group consisting of alkyl containing 1 to 10 carbon atoms, hydroxyalkyl containing 1 to 10 carbon atoms, unsubstituted aryl containing 6 to 10 carbon atoms, substituted aryl wherein the substituents are selected from the group consisting of alkyl containing 1 to 10 carbon atoms, halogen and mixtures thereof, alkenyl containing 2 to 10 carbon atoms, aralkyl containing 7 to 20 carbon atoms, and hydrogen, provided a maximum of one of $R_3$ and $R_4$ is hydrogen.

2. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-phenyl-O-ethyl S-(N,N-diethylcarbamylmethyl) dithiophosphate.

3. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-phenyl-O-methyl S-(N-methyl-N-isopropylcarbamylmethyl) dithiophosphate.

4. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-phenyl-O-n-propyl S-(N-ethyl-N-phenylcarbamylmethyl) dithiophosphate.

5. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-2,4-dichlorophenyl-O-ethyl S-(N-n-propyl-N-ethylcarbamylmethyl) dithiophosphate.

6. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-2-methyl-4-chlorophenyl-O-isopropyl S-(N-methyl-N-phenycarbamylmethyl) dithiophosphate.

7. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-phenyl-O-ethyl S-(N-ethyl-N-isopropylcarbamylmethyl) dithiophosphate.

8. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-4-methylphenyl-O-ethyl S-(N-methyl-N-methylbenzylcarbamylmethyl) dithiophosphate.

9. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-4-methylthiophenyl-O-methyl S-(N-ethyl-N-4-chlorophenylcarbamylmethyl) dithiophosphate.

10. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-phenyl-O-ethyl S-(N,N-diallylcarbamylmethyl) dithiophosphate.

11. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-3-cyanophenyl-O-ethyl S-(N-allyl-N-octyl carbamylmethyl) dithiophosphate.

12. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-phenyl-O-ethyl S-(N-methyl-N-isopropylcarbamylmethyl) dithiophosphate.

13. A method for the control of undesirable plant life which comprises applying to the locus of the undesirable plant infestation a herbicidal composition comprising an inert carrier and as the essential active ingredient, in a quantity which is herbicidally injurious to said undesirable plant life, O-phenyl-O-ethyl S-(N-phenyl-N-ethylcarbamylmethyl) dithiophosphate.

References Cited

UNITED STATES PATENTS

| | | | |
|---|---|---|---|
| 2,494,283 | 1/1950 | Cassaday et al. | 260—943 |
| 2,841,486 | 7/1958 | Osborn et al. | 71—2.7 |
| 3,102,019 | 8/1963 | Speziale et al. | 71—2.6 |
| 3,102,023 | 8/1963 | Speziale et al. | 71—2.7 |

JAMES O. THOMAS, Jr., *Primary Examiner.*